Figure 1:
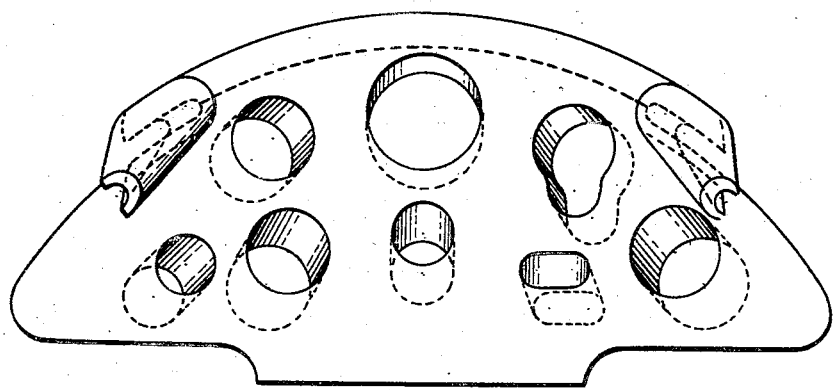

Oct. 19, 1943.   W. UFFELMAN   2,332,357
CRASH PAD FOR AIRPLANES
Filed Oct. 15, 1941

INVENTOR.
WALTER UFFELMAN
BY Benj. T. Rauber
ATTORNEY.

Patented Oct. 19, 1943

2,332,357

UNITED STATES PATENT OFFICE 2,332,357

CRASH PAD FOR AIRPLANES

Walter Uffelman, Toronto, Ontario, Canada, assignor to Dunlop Tire and Rubber Corporation, Buffalo, N. Y., a corporation of New York Application October 15, 1941, Serial No. 415,088
In Canada March 24, 1941

3 Claims. (Cl. 117—33)

This invention relates to cellular rubber, and more particularly to cellular rubber having an improved surface covering.

Due to its nature, cellular rubber is readily susceptible to deterioration if exposed to sunlight for any length of time. In addition, the surface skin of a cellular rubber article has low structural strength. For these reasons articles made of cellular or sponge rubber must of necessity be covered. The usual method of covering is by means of a cloth or leather slip-cover which is sewn into place. This practice is highly successful when the articles are of a simple or uniform shape, as in the case of chair pads, cushions for automobile and furniture seats and mattresses. It will be readily understood, however, that if the article is of a complicated design it is difficult and indeed impractical, to cover it with a fabric or leather cover.

As an alternative method for covering intricate and complicated designs of cellular rubber it has been proposed to use a lacquer coating composition. However, due to the spongy nature of the material the coating composition must necessarily be extremely flexible and in order to obtain such a flexible coating the lacquer employed has had to contain so much plasticizer (to maintain maximum flexibility) that it has remained in a more or less "tacky" or objectionable condition. Even so, the limits of flexibility of the lacquer have not heretofore been sufficient to match the flexibility of the cellular rubber.

My present invention provides a covering for cellular rubber, of either the sponge rubber or foamed latex or other type, that is of a flexibility equal to or approaching that of the surface of the rubber, that effectively protects the cellular rubber from the destructive action of light, which is highly wear-resistant and which greatly increases the strength of the surface of the rubber and which may be applied easily and at low cost both to articles of simple and those of complicated shape or configuration.

The cover of my invention is also closely adherent to the surface of the cellular rubber and may form a structure substantially integral with it.

My invention also provides a method whereby the cover structure may be easily applied or formed on the surface of cellular articles.

In my invention the cover is formed immediately on the surface of the cellular rubber by providing an adhesive or tacky surface for the cellular rubber and applying thereon a flock material which becomes embedded in the adhesive or tacky surface and forms a suede-like cover or finish. The tacky or adhesive surface may be formed on or applied to the cellular rubber surface by any suitable means or in any suitable way as, for example, by applying thereto an adhesive coating or material that will form an adhesive surface or coating on the rubber. This permits the coating to be formed regardless of the complexity of the surface. By then applying the flock to the surface by means known in the art, a protective suede-like surface will be built up.

In carrying out my invention a moulded cellular article is first covered with a heavy coat of rubber cement or adhesive. This may be done by any of the well known methods of coating, such as brushing, spraying or spreading. Since the invention is especially applicable to intricately shaped articles, in such cases application of the cement by brushing or spraying is preferred. Before the cement has thoroughly dried and while it is still in a tacky or sticky condition, a covering of flock fibres is applied. The flock may be applied by means of spray gun, by air floating or by hand application. Following the application of the flock, the pad is beaten lightly to settle the flock fibres so that they will sink into the tacky adhesive. The adhesive is then set after which all excess flock is blown or whisked off.

It should be understood that the methods of cementing and flocking may be varied to suit production requirements, and it should be noted that since the flock covering may also be required to produce a decorative effect the use of coloured flock to attain this end is contemplated.

The cement or adhesive referred to may consist of:

(a) A high concentration rubber cement compounded with light resisting and curing ingredients to set at a temperature of 150° F.

(b) A cement made from a compounded synthetic rubber, such as neoprene.

(c) A compounded latex of either rubber or synthetic rubber. Any other type of flexible cement film may be used without departing from the nature of the invention.

The cement made from polymerized chloroprene (known generically as neoprene) is one of the preferred cements, since it can be made into a high concentration cement without much milling, whereas rubber requires long milling time, in order to make a cement with high concentration. Neoprene also is more light and heat resisting than rubber, although the latter can be compounded to resist light and heat.

Figure 2:
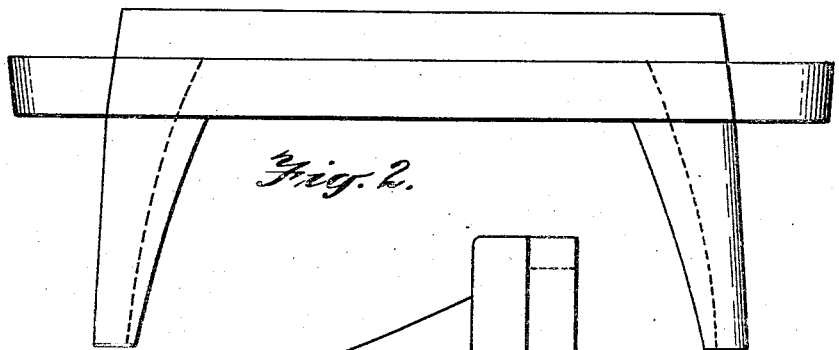
Figure 3:
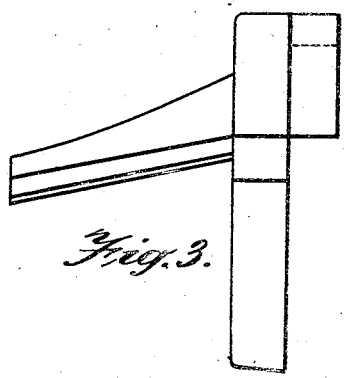
Figure 4:
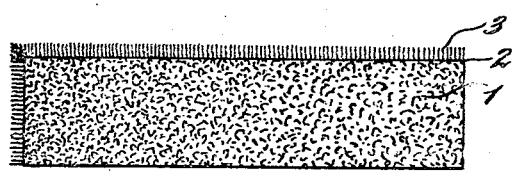

The various features of my invention are illustrated, by way of example, in the accompanying drawing in which Fig. 1 is a plan view of an intricately shaped pad such as a crash pad of the type used on aircraft. Fig. 2 is an elevation view of this pad. Fig. 3 is an end view of the same pad. Fig. 4 is an enlarged perspective of a portion of the pad in which (1) represents the pad, (2) represents a layer of cement in adhesion with the pad and (3) represents a layer of flock adhered to the layer of cement.

The foamed latex pad is brushed with a high concentration rubber cement of the following composition:

|  | Pounds | Ounces |
| --- | --- | --- |
| Neoprene | 18 | 15 |
| Heavy calcined magnesia | 1 | 14 |
| Rosin |  | 15 |
| Zinc oxide | 1 | 14 |
| Green pigment |  | 6 |
| Total | 24 |  |

This cement is prepared by milling the above ingredients in the normal way, then making into a cement by churning, using xylol as solvent. The resultant cement has a solids concentration of 25 per cent.

The cement-coated pad while still in a tacky condition is introduced into a flocking box which has a window in the lid for observation purposes. Arm holes in the front of the box permit of the pad being turned during the flocking operation.

The flocking is done by placing in the box a pile of green flock and blowing into it from an air hose a stream of air in such a way that the flock is forced up the side walls and floats across the lid. The air pressure is so adjusted that the flock settles in downy form over the tacky cement surface of the pad. By turning the pad around, as the flock descends the flat and cavity surfaces become covered with flock. Should it so happen that a portion of a cavity does not receive sufficient flock, this area is subsequently covered by sifting flock onto it through a sieve. The pad is then patted by hand in order further to distribute and settle the flock and at the same time to dislodge any excess flock. The coated pad is then placed in a drying oven at a temperature of about 150° F. until the cement has thoroughly set and any unadhered flock is then removed, as by brushing or shaking. The resulting finish resembles suede.

The wet cement penetrates through the porous skin of the moulded cellular rubber articles, and as the solvent dries, the cement film becomes locked in place in much the same way as an open piece of screening can be anchored into rubber by the latter flowing through the meshes of the screen and uniting on the opposite side. This is especially the case with foamed latex material where all the cells are interconnected, and so the cement will penetrate instead of merely lying on top of the surface. As the cement dries out and vulcanizes the flock embedded becomes firmly bonded. This produces a flexible covering which is integral with the cellular rubber article.

The specific application described is for the covering of crash pads used in airplanes. These are of a very complicated design since they fit over the instrument panel. In the example, green cement and green flock are used for optical reasons for diffusing glare. However, the cement and flock may be of any desired colour, without departing from the nature of the invention.

The flock may consist of cotton, wool or a mixture thereof. Also wood fibres or synthetic fibres such as rayon or Celanese may be used. In addition, the use of rock fibres or any ground fibre is contemplated as falling within the scope of the invention.

The particles of flock become embedded in the tacky surface so as to become anchored therein and project somewhat above the surface, sufficient to interrupt light or other radiant energy from passing to and attacking the underlying cellular rubber. The coating of cement with the embedded flock has a relatively high tensile strength and at the same time a high degree of flexibility and stretchability.

What I claim is:

1. A crash pad for aircraft which comprises a block of cellular rubber having openings extending therethrough, an adherent and protective coating of heat and light resistant flexible resilient composition covering the surface of said crash pad and of said openings therein and flock fibers embedded in said coating.

2. A crash pad for aircraft which comprises a block of cellular rubber having openings therethrough and an adhesive and protective coating of rubber composition compounded to resist heat and light covering the surface of said crash pad and of said openings therein and flock fibers embedded in said coating.

3. A crash pad for aircraft which comprises a block of foamed latex rubber having openings extending therethrough, an adhesive protective coating of compounded rubber material comprising polymerized chloroprene and small amounts of calcined magnesia, zinc oxide, rosin and pigment covering the surface of said crash pad and of said openings therein and flock fibers embedded in said coating.

WALTER UFFELMAN.